Patented Apr. 13, 1926.

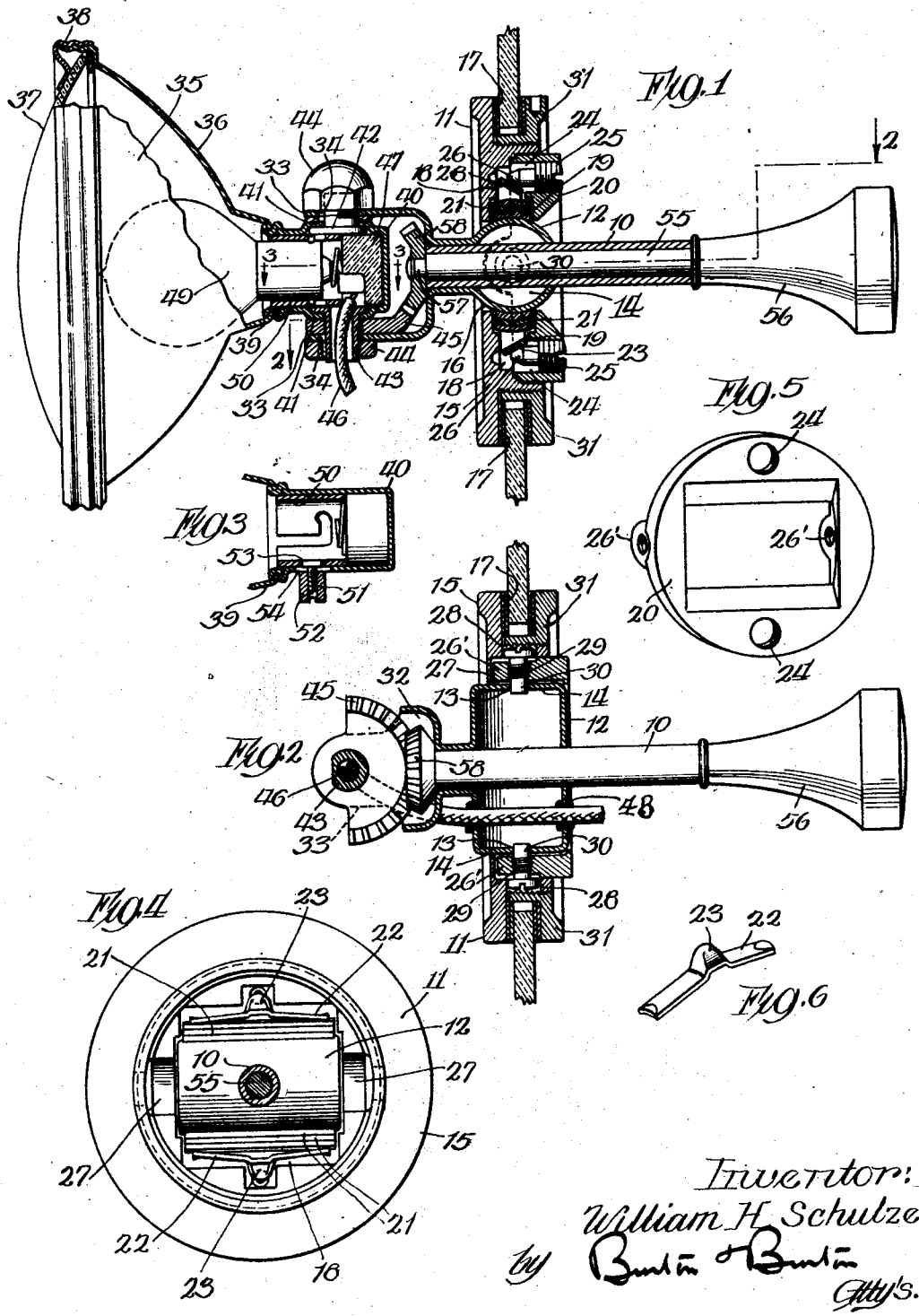

1,580,172

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

SEARCHLIGHT MOUNTING.

Application filed March 15, 1924. Serial No. 699,394.

*To all whom it may concern:*

Be it known that I, WILLIAM H. SCHULZE, a citizen of the United States, residing in the city of Chicago, in the county of Cook and State of Illinois, have invented certain new and useful Improvements in Searchlight Mountings, of which the following is a specification, reference being had to the accompanying drawings, forming a part thereof.

This invention relates to improvements in dirigible spot lights for motor vehicles and the like, and more particularly to those of the type designed to be mounted in an opening in the body of the vehicle or in the glass of the windshield thereof with the light emitting portion on one side and the operating means on the other.

One object of the invention is to provide in a spot light of this character improved means for controlling and operating the light emitting portion thereof. This controlling or operating mechanism employs but a single operating handle arranged to have an angular as well as a rotational adjusting motion and through manipulation of which the light emitting portion may be moved both through its vertical and horizontal ranges of adjustment.

Another object of the invention resides in the provision of means whereby the light emitting portion of the spot light may be adjusted through an angle of substantially 180° in the horizontal plane thereby enabling the driver to manipulate the same in such wise that the rays of light may be projected at substantially right angles to the path of travel of the vehicle for the purpose of illuminating sign posts, numbers of buildings, etc. should occasion require.

Various other objects and advantages of the invention will be apparent from the following description taken in connection with the accompanying drawings wherein one form of the invention is illustrated.

In the drawings:

Fig. 1 is a longitudinal sectional view of a spot light constructed in accordance with the present invention and showing the same operatively mounted in an opening in the windshield of a vehicle.

Fig. 2 is a sectional view taken on line 2—2, Fig. 1.

Fig. 3 is a sectional view taken on line 3—3, Fig. 1.

Fig. 4 is a rear elevation of the support or windshield mounting for the lamp, the retaining member of the mounting being removed.

Fig. 5 is a perspective of the retaining member, and

Fig. 6 is a perspective view of one of the follower plates employed in connection with the supporting member.

Referring more in detail to the drawings, the spot light comprises an elongated hollow stem 10 which projects through a support designated in its entirety as 11, and which serves for mounting the spot light in an opening in the body of a vehicle as, for instance, the windshield. The stem 10 extends on both sides of support 11, the latter preferably being disposed in the plane of the body portion of the vehicle in which it is mounted. Intermediate the ends of stem 10 the same is provided with an enlarged transversely extending cylindrical bearing member 12 having central apertures 13 formed in its end walls 14. The support 11 comprises a disk like member 15 having a central opening 16 therein of rectangular design for receiving one side of bearing member 12, said member 15 being also provided with a shoulder or seat 17 extending therearound adjacent its outer periphery. The inner face of member 11 or that face thereof which when said member is operatively mounted is directed towards the interior of the vehicle is channelled out on either side of opening 16 to provide correspondingly shaped recesses 18 which, together with similarly shaped recesses 19 provided in the adjacent face of retaining plate 20 form oppositely directed pockets in which clamping members in the form of elongated plates 21 superimposed against bearing member 12 on opposite sides thereof are housed. A follower plate 22 in the form of bowed metal strip provided with a raised centrally located cam surface 23 is mounted against the outer clamping plate of each group in such wise that the said cam surfaces 23 incline downwardly and inwardly, as shown in Fig. 1.

The retaining plate 20 is provided with a plurality of screw-threaded apertures 24 adjacent its outer periphery for receiving adjusting screws 25 having tapered inner extremities 26 designed to engage the cam surfaces 23 of follower members 22 so that the friction or clamping action upon bearing member 12 of stem 10 may be varied as desired. The retaining plate 20 is provided with ears 26' having screw threaded openings therein which ears when said plate is in position project into correspondingly shaped recesses 27 in the disk like member 11 with the screw threaded apertures thereof in alinement with apertures 28 provided in the disk like member 11, and also with apertures 13 in the end walls 14 of bearing member 12, all shown more clearly in Fig. 2.

Headed screw threaded members 29 having smooth inner ends 30 screw threadedly engage ears 26' of the retaining plate 20 in such wise that the inner ends thereof engage apertures 13 of bearing member 12 serving as trunnions therefor. When in this position the heads of said members 29 lie entirely within apertures 28 in disk like member 15. In this manner, the members 15 and 20 are secured operatively together, adjusting screws 25 serving to hold the parts firmly and against relative vibration or rattling in addition to providing the clamping action on the bearing member 12. Retaining plate 20 is also provided with a central opening of rectangular design corresponding to opening 16 in member 15 for receiving the opposite side of bearing member 12 and to permit of pivotal adjustment of said bearing member on trunnions 30. The entire support 11 is clamped firmly in position in a suitable opening in the body or windshield of a vehicle by means of the clamping ring 31 which screw threadedly engages the disk like member 15 clamping the windshield or other part of the vehicle between it and the adjacent seat or shoulder 17, as shown in Figs. 1 and 2. When thus in position all access to the screw threaded members 29 is obstructed so that the entire support is effectively locked against removal except from the interior of the vehicle where the same may be removed by first removing clamping ring 31. Removal from the exterior of the vehicle, however, is not feasible.

The bearing member 12 at its outer end terminates in an outwardly flared member 32 which is provided with diametrically opposite outwardly extending arms or fingers 33, each apertured, as at 34. The lamp is shown at 35, and comprises the usual reflector 36, glass front 37 and crimped retaining ring 38. At its reduced portion 39, reflector 36 is attached to socket portion 40 which latter projects rearwardly between the arms 33 of the bearing member 12, which are carried at the outer end of stem 10. The socket portion 40 of the lamp is provided with diametrically opposite apertured raised portions 41 which receive and retain the headed ends 42 of screw threaded trunnions 43, the latter projecting outwardly in opposite directions through the apertures of said raised portions and through the apertures 34 in arms 33, suitable nuts or the like 44 engaging the trunnions at their outer ends and holding the lamp in position. The openings in the raised portions 41 through which the trunnions extend are of irregular contour and the said trunnions correspondingly shaped so that relative rotative movement is prevented. Intermediate one of the raised portions 41 and the adjacent arm 33 a gear segment 45 is interposed through which the corresponding trunnion 43 also extends. The opening in the gear segment through which the trunnion extends is also of irregular contour corresponding to that of the trunnion so that relative rotation is prevented, or, in other words, so that upon movement of the gear segment the lamp will be angularly adjusted in either one direction or the other.

Extending through and journaled in the hollow stem 10 is an operating rod 55 provided at its inner end with a knob 56 and which at its outer end is slightly reduced, as at 57, and has fixed thereon a gear wheel 58. This gear wheel 58 meshes with segment gear 45 so that any rotational adjustments of rod 55 will result in lamp 35 being adjusted in one direction or the other on its supporting trunnions, as will be readily understood. It is preferred to construct the segment gear 45 of substantially 180° extent so that the lamp may have a corresponding range of adjustment in the horizontal plane. In addition to adjustments in the horizontal plane, the lamp may also be moved in a vertical plane through raising or lowering knob 56. This causes bearing member 12 to be rotated on its trunnions 30 which results in bodily adjustment of the lamp in the vertical plane regardless of the horizontal adjustment thereof, and if desired the lamp may be adjusted in both planes simultaneously in that both adjustments are effected through a common operating member. Through proper adjustment of the screws 25 and nuts 44 the spot light will be maintained in any of its various positions of adjustment without danger of accidental displacement due to vibration, or the like.

The trunnion 43 which carries the gear segment 45 may be hollow to permit of the wiring cord 46 being projected therethrough into the base 47 of the socket for connection to the terminals in the usual manner. From the hollow trunnion 43 this cord is preferably extended directly through suitable openings 48 in the cylindrical bearing member 12 and into the interior of the vehicle where a switch of any suitable type may be interposed and conveniently mounted in the front compartment of the vehicle within easy reach of the driver.

The incandescent lamp is shown at 49 and is removably held in the socket by means of the usual bayonet joint. The sleeve 50 in which the bayonet slots are formed is longitudinally adjustable to permit of proper focusing of the lamp. This adjustment of sleeve 50 may be quickly effected through the instrumentalities of the flat headed screw 51 and nut 52 from the exterior of the lamp casing and without dismantling the lamp or any of the other parts of the spot light. The square head of screw 51 is received within a similarly shaped opening 53 in the sleeve 50, the shank projecting outwardly through slot 54 in the socket portion 40 of the casing, the slot being of such size as to prevent the head passing therethrough. Thus, it will be observed that by loosening nut 52 the same may be employed to move sleeve 50 back or forth to properly focus the lamp. When the desired or proper position has been reached the nut 52 is again tightened to hold the parts in adjusted position.

It will be obvious to those skilled in the art that the invention is susceptible of various changes and modifications without departing from the spirit thereof, and accordingly it is not desired to limit or restrict the same to the particular form or arrangement of parts herein illustrated and described except where limitations appear in the appended claims.

I claim:—

1. In combination with a vehicle windshield or the like, a spotlight comprising a lamp casing in front of the windshield, a support for said casing extending through an opening in the windshield and pivotally jointed at a point in front of the latter, mounting means secured in the windshield opening and pivotally carrying the support at an axis substantially in the plane of the glass and transverse to the axis of the pivotal joint.

2. In combination with a vehicle windshield or the like, a spotlight comprising a lamp casing positioned in front of the windshield, a support for said casing extending through an opening in the windshield and pivotally jointed at a vertical axis between the lamp and the windshield, mounting means secured in the windshield opening and pivotally carrying the support at a horizontal axis substantially in the plane of the glass.

3. In the combination defined in claim 1, means carried by the support at the rear side of the windshield relatively movable in said support and operatively connected with the lamp casing for swinging it about the axis of said joint in the support.

4. In combination with a vehicle windshield or the like having an aperture, a spotlight comprising a lamp casing in front of the windshield, a hollow stem extending through the aperture having an enlargement of circular cross-section, mounting means secured in the aperture snugly fitting the enlargement to permit swinging the stem about the axis of its circular enlargement, said axis lying substantially in the plane of the windshield, a pivotal joint disposed between the windshield and the lamp casing with its axis transverse to that of the enlargement, together with a shaft journaled in the hollow stem, gearing connecting the forward end of said shaft with the lamp casing for swinging it about the axis of the said joint and a handle for said shaft at the rear side of the windshield adapted for rotating the shaft or rocking the stem at will.

In testimony whereof, I have hereunto set my hand at Chicago, Illinois, this 12th day of March, 1924.

WILLIAM H. SCHULZE.